(12) United States Patent
Li et al.

(10) Patent No.: US 8,949,874 B1
(45) Date of Patent: Feb. 3, 2015

(54) EVALUATING MEDIA CHANNELS

(71) Applicant: Google Inc., Mountain View, CA (US)

(72) Inventors: Wenxin Li, Mountain View, CA (US); Zhihui Chen, Menlo Park, CA (US); Nitin Jindal, Sunnyvale, CA (US); Nitin Khandelwal, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/926,984

(22) Filed: Jun. 25, 2013

(51) Int. Cl.
*H04H 60/32* (2008.01)
*G06F 3/00* (2006.01)
*G06F 13/00* (2006.01)
*H04N 5/445* (2011.01)
*H04N 21/442* (2011.01)
*H04N 21/232* (2011.01)

(52) U.S. Cl.
CPC ............ *H04N 21/442* (2013.01); *H04N 21/232* (2013.01)

USPC .............................................. 725/14; 725/53

(58) Field of Classification Search
None
See application file for complete search history.

(56) References Cited

U.S. PATENT DOCUMENTS

| | | | |
|---|---|---|---|
| 8,407,207 B1 | 3/2013 | Chen et al. | |
| 2010/0154003 A1* | 6/2010 | Bi et al. | 725/46 |
| 2011/0173212 A1* | 7/2011 | Tuttle et al. | 707/752 |

* cited by examiner

*Primary Examiner* — Oschta Montoya
(74) *Attorney, Agent, or Firm* — Lowenstein Sandler LLP

(57) ABSTRACT

A computer system determines feature metrics for a content channel. The content channel includes one or more media items. The computer system receives a query that corresponds to a query types. The query type is associated with a subset of the feature metrics. The computer system evaluates the content channel based on the subset of feature metrics to produce a channel score for the query type and provides the channel score to position at least one of the media items of the content channel in a query result of the query.

20 Claims, 6 Drawing Sheets

EVALUATING MEDIA CHANNELS

TECHNICAL FIELD

The present disclosure relates to media channels and, more particularly, to a technique of evaluating media channels.

BACKGROUND

On the Internet, content sharing platforms or other applications allow users to upload, view, and share digital content such as media items. Such media items may include audio clips, movie clips, TV clips, and music videos, as well as amateur content, such as video blogging, short original videos, pictures, photos, other multimedia content, etc. Users may use computing devices (such as smart phones, cellular phones, laptop computers, desktop computers, netbooks, tablet computers, gaming consoles, television consoles) to use, play, and/or consume media items (e.g., watch digital videos, and/or listen to digital music).

The content sharing platforms can include one or more channels, which can be viewable over the Internet. A channel is a mechanism for providing certain media items and/or for providing access to media items to subscribers. Media items for the channel can be selected by a user, uploaded by a user, selected by a content provider, or selected by a broadcaster. Traditional search systems and/or recommendation systems may receive queries for media items (e.g., videos) and can evaluate a source of media items to generate search results and/or recommendations of the media items for the queries. The search results and/or recommendations may include media items from one or more channels. Conventional search systems and/or recommendation systems, however, typically do not evaluate the reputation of the channels when determining the search results and/or recommendations.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

A method and system to evaluate a content channel is described. The method includes determining feature metrics for a content channel. The content channel includes one or more media items. The method further includes receiving a query corresponding to one type of query. The query type is associated with a subset of the feature metrics. The method further includes evaluating the content channel based on the subset of feature metrics to produce a channel score for the query type and providing the channel score to position at least one of the media items of the content channel in a query result of the query.

In one implementation, the query type is a query based on the freshness of data, a query based on the quality of data, a query related to channels, or a query related to language demotion. In one implementation, the feature metrics include channel metrics and media item metrics for the one or more media items. In one implementation, the channel metrics include two or more of a subscriber count, a number of media items associated with the channel, a number of likes of the channel, a number of recommendations of the channel, a number of online media item views of the channel, a number of categories associated with the channel, a type of category associated with the channel, a channel page rank, and/or an indicator of the channel being accessed globally. In one implementation, the media item metrics include two or more of a consumption time metric, a number of likes, a number of recommendations, a number of views, a ranking, a metric related to release of the media item, and/or consumption locale. In one implementation, the method further includes determining channel scores for the channel. The channel scores correspond to the query types. In one implementation, the method further includes assigning the channel scores for the channel to the one or more media items of the channel.

An apparatus to evaluate a content channel is also described. The apparatus includes means for determining feature metrics for a content channel. The content channel includes one or more media items. The apparatus further includes means for receiving a query corresponding to one type of query. The query type is associated with a subset of the feature metrics. The apparatus further includes means for evaluating the content channel based on the subset of feature metrics to produce a channel score for the query type and providing the channel score to position at least one of the media items of the content channel in a query result of the query.

In one implementation, the query type is a query based on the freshness of data, a query based on the quality of data, a query related to channels, or a query related to language demotion. In one implementation, the feature metrics include channel metrics and media item metrics for the one or more media items. In one implementation, the channel metrics include two or more of a subscriber count, a number of media items associated with the channel, a number of likes of the channel, a number of recommendations of the channel, a number of online media item views of the channel, a number of categories associated with the channel, a type of category associated with the channel, a channel page rank, and/or an indication of the channel being consumed globally. In one implementation, the media item metrics include two or more of a consumption time metric, a number of likes, a number of recommendations, a number of views, a ranking, a metric related to release of the media item, and/or a consumption locale. In one implementation, the apparatus further includes means for determining channel scores for the channel. The channel scores correspond to the query types. In one implementation, the apparatus further includes means for assigning the channel scores for the channel to the one or more media items of the channel.

In additional implementations, computing devices for performing the operations of the above described implementations are also implemented. Additionally, in implementations of the disclosure, a computer readable storage media may store instructions for performing the operations of the implementations described herein.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
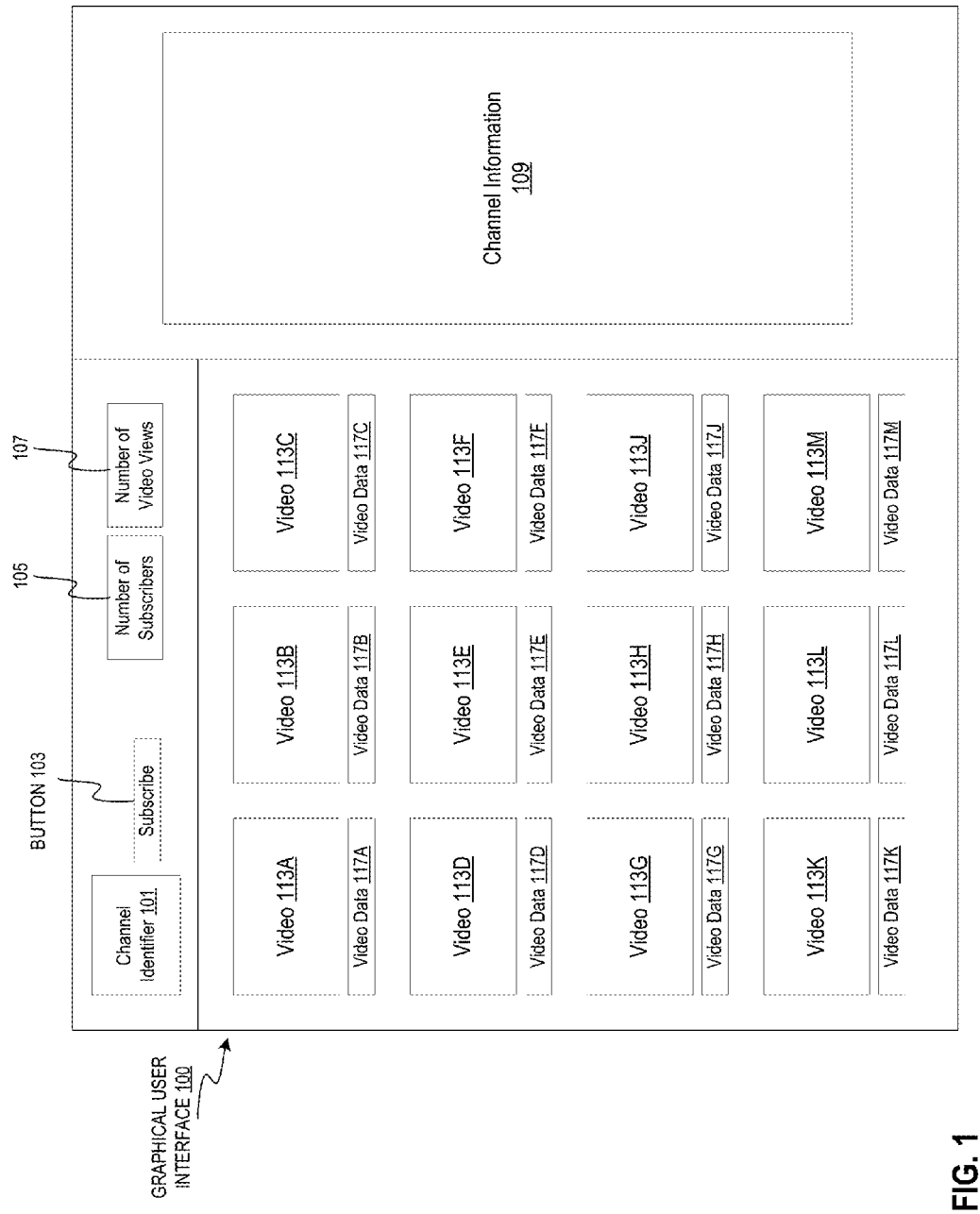
FIG. 1 is a diagram illustrating an example graphical user interface in accordance with one or more implementations.

A system and method for evaluating a channel is described, according to various implementations. A channel can be data content available from a common source or data content having a common subject or theme. For example, a channel can be a collection of videos viewable via a graphical user interface (GUI). The content (e.g., videos) of the channel can be accessed by users. A channel is also hereinafter referred to as a "content channel". A channel can have an owner that uploads particular media items (e.g., videos) for the channel. A channel owner can be an entity. An entity can include, and is not limited to, a user, a group of users, a business organization such as a corporation, an educational institution such as a college and university, etc. For example, an entity "Sports Programming Network" may have a channel with data content that is accessed through the Internet and/or applications (e.g., mobile applications, desktop applications, gaming applications, television applications, etc.). The channel for the Sports Programming Network may include multiple videos, such as a video of the previous night's basketball playoff game, a video of the last inning in a recently played baseball game, a video of game highlights of games played that day, a video of an athlete announcing retirement at a press conference, a video of an interview with an athlete, etc.

Examples of a media item can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. A media item can be a media item consumed via the Internet and/or via an application. For brevity and simplicity, an online video (also hereinafter referred to as a video) is used as an example of a media item throughout this document. As used herein, "media," "media item," "online media item," "digital media," and a "digital media item" can include an electronic file that can be executed or loaded using software, firmware or hardware configured to present the digital media item to an entity.

Users may subscribe to one or more channels to be able to automatically view media items (e.g., videos) of the channel. For example, the Sports Programming Network channel may have over one million subscribers. The channel can host one or more media items. For example, the Sports Programming Network channel may host thousands of videos. Implementations of the present disclosure can evaluate a channel based on the features of the channel and the features of the media items (e.g., videos) that are hosted by the channel. Implementations can generate channel scores for the channel for various types of media item queries and can assign the channel scores to the videos of the channel. For example, a query type may be a query that is based on the freshness of the data. A freshness query type may be for videos of a basketball game that was recently played. Implementations may generate a channel score for the Sports Programming Network channel for a freshness query type using a subset of the channel features (e.g., channel metrics, video metrics) for the Sports Programming Network channel. A search system can use the channel score to rank the videos of the Sports Programming Network channel in a query result. For example, the Sports Programming Network channel may have a favorable freshness channel score, and the freshness channel score for the Sports Programming Network channel may be assigned to the individual videos in the Sports Programming Network channel. Search results, which may include videos from the Sports Programming Network channel, may position the videos from the Sports Programming Network channel more favorably than the videos from other channels, based at least in part on the freshness channel score of the Sports Programming Network channel. As a result, videos can be ranked and recommended by taking into account the reputation of channel (e.g., channel score) that is assigned to the videos. The channel scores can be associated with particular types of searches (e.g., freshness, quality, etc.), and the videos can be ranked and recommended by taking into account the type of search and the channel scores that are assigned to the video for the particular type of search.

FIG. 1 is a diagram illustrating an example graphical user interface (GUI) 100 in accordance with one implementation of the present disclosure. In one implementation, the GUI 100 may be a document (e.g., webpage) of a channel of a content sharing platform. For example, the GUI 100 may be presented by and/or displayed within a web browser when a user accesses the content sharing platform via the web browser. In another implementation, the GUI 100 may be a home interface or a main interface presented by a media viewer (e.g., an app, an application, a program, a software module/component, etc., that may be used to view, play, and/or consume media items). Although the GUI 100 is illustrated using buttons (e.g., button 103), other implementations may use links and/or other graphical user interface controls or elements in place of one or more of the buttons. It should be understood that in other implementations, other visual indicators such as graphic representations, and/or text can be presented to a user to provide channels to the user.

The GUI 100 can include a channel identifier 101 and can display media items (e.g., videos 113A-M) that are in the channel. The GUI 100 can include one or more GUI elements (e.g., button 103) to allow users to subscribe to the channel. The GUI 100 can include, for example, and not limited to, information that describes the number 105 of subscribers of the channel, the number 107 of media item (e.g., video) views of the channel, the number of likes of the channel, and additional channel information 109. Examples of additional channel information 109 can include, and are not limited to, a description of the channel, playlists related to the channel, other channels that are related to the channel, etc. The GUI 100 can be changed periodically to include up-to-date information. For example, the number 105 of subscribers may be increased each time the GUI 100 is updated.

The GUI 100 can include information about the individual media items (e.g., videos 113A-M). For example, the GUI 100 may include video data 117A-M for the corresponding videos 113A-M. Examples of video data 113A-M can include, and are not limited to, a title of the video, a number of views of the video, the time elapsed since the video was uploaded, the time the video was uploaded, the number of likes of the video, the number of recommendations made for the video, the length of the video, a rating of the video, etc.

Figure 2:
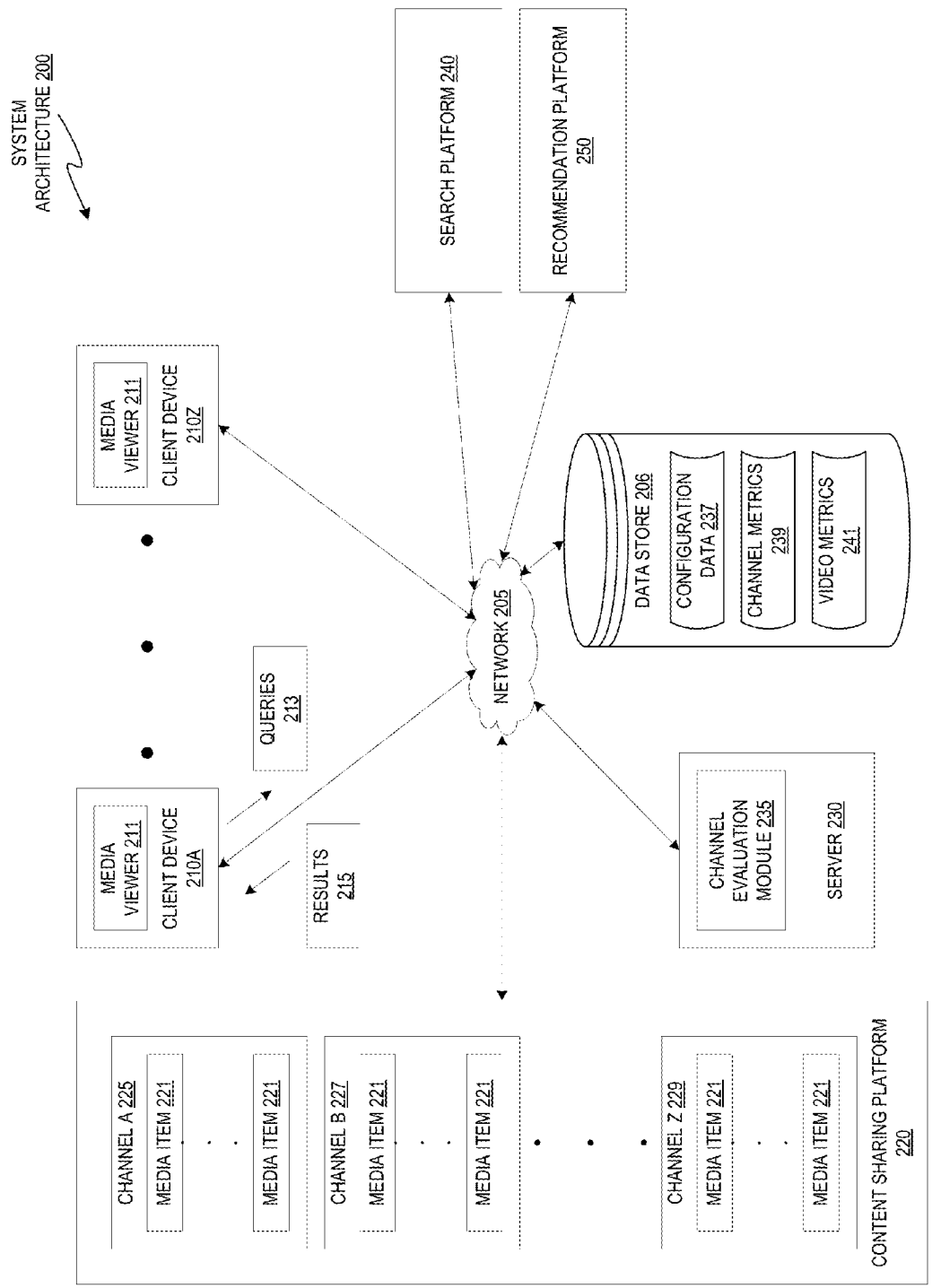
FIG. 2 illustrates example system architecture, in accordance with one or more implementations.

FIG. 2 illustrates example system architecture 200, in accordance with various implementations. The system architecture 200 can include one or more client devices 210A-Z, one or more networks 205, one or more data stores 206, a content sharing platform 220, one or more servers 230, and one or more platforms (e.g., search platform 240, recommendation platform 250, etc.). The one or more networks 205 can include one or more public networks (e.g., the Internet), one or more private networks (e.g., a local area network (LAN) or one or more wide area networks (WAN)), one or more wired networks (e.g., Ethernet network), one or more wireless networks (e.g., an 802.11 network or a Wi-Fi network), one or more cellular networks (e.g., a Long Term Evolution (LTE) network), routers, hubs, switches, server computers, and/or a combination thereof. In one implementation, some components of architecture 200 are not directly connected to each other. In one implementation, architecture 200 includes separate networks 205. The one or more data stores 206 can be memory (e.g., random access memory), cache, drives (e.g., hard drive), flash drives, database systems, or another type of component or device capable of storing data. The one or more data stores 206 can include multiple storage components (e.g., multiple drives or multiple databases) that may also span multiple computing devices (e.g., multiple server computers).

The client devices 210A-Z can include devices, such as, cellular telephones, personal digital assistants (PDAs), portable media players, netbooks, laptop computers, electronic book readers, tablet computers, desktop computers, set-top boxes, gaming consoles, televisions, and the like. The individual client devices 210A-Z can include a media viewer 211. In one implementation, the media viewers 211 are applications that allow users to view content, such as images, videos, documents (e.g., web pages), etc. For example, the media viewer 211 may be a web browser that can access, retrieve, present, and/or navigate content (e.g., web pages such as Hyper Text Markup Language (HTML) pages, digital media items, etc.) served by a web server. The media viewer 211 can render, display, and/or present the content (e.g., a web page, a media viewer) to a user. The media viewer 211 may also display an embedded media player (e.g., a Flash® player or an HTML5 player) that is embedded in a document (e.g., a web page). In another example, the media viewers 211 may be standalone applications (e.g., mobile applications, desktop applications, gaming console applications, television applications, etc.) that allow users to view digital media items (e.g., digital videos, digital images, electronic books, etc.). The media viewers 211 can be provided to the client devices 210A-Z by the server 230 and/or content sharing platform 220. For example, the media viewers 211 may be embedded media players that are embedded in documents (e.g., web pages) provided by the content sharing platform 220. In another example, the media viewers 211 may be applications that are downloaded from the server 230. In another example, the media viewers 211 may be standalone applications that are pre-installed on the client devices 210A-Z.

The content sharing platform 220 can include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 220 may allow a user to consume, upload, search for, approve of ("like"), dislike, edit, recommend, share, rate, and/or comment on media items. The content sharing platform 220 can include a website (e.g., one or more webpages) and/or one or more applications that may be used to provide a user with access to the media items. The content sharing platform 220 includes multiple channels (e.g., Channel A 225 through Channel Z 229). Each channel may include one or more media items 221. In one implementation, the content sharing platform 220 stores the media items using the data store 206.

The platforms (e.g., search platform 240, recommendation platform 250) can include one or more computing devices (e.g., servers), data stores, networks, software components, and/or hardware components that may be used to allow users to access media items 221. The platforms can include a content sharing aspect that allow users to consume, upload, search for, approve of ("like"), dislike, edit, recommend, share, rate, and/or comment on media items 221. In one implementation, the content sharing platform 220 may be integrated with the platforms. For example, the search platform 240 may allow a user to submit queries 213 via the client devices 210A-Z to search the Internet and/or other networks for media items, including the media items 221 of the channels A-Z, related to a particular topic (e.g., how to fix a car). The search platform 240 may also include a search engine. The platforms can generate and provide results 215 for the queries 213 to the client devices 210A-Z. In another implementation, the platforms may be separate from the content sharing platform 220.

The server 230 can be one or more computing devices (e.g., a rackmount server, a server computer, etc.). In one implementation, the server 230 is included in one or more of the content sharing platform 220 or the platforms. In another implementation, the server 230 is separate from the content sharing platform 220 and/or platforms, but may communicate (e.g., exchange data with) the content sharing platform 220 and platforms.

The server 230 can include a channel evaluation module 235 to evaluate the channels (e.g., Channels A-Z) and to generate channel scores for the channels. The channel scores for a channel can be based on the features of the channel itself and the features of the media items 221 (e.g., videos) that correspond to the channel. There can be various types of channel scores for a channel, for example, based on the type of query 213 that is made. Examples of query types can include, and are not limited to, a query based on the freshness of data, a query based on the quality of data, a query related to channels, a query related to language demotion/promotion, etc.

For example, there may be a query 213 that is based on the freshness of the media item 221. For example, a user may submit a query 213 for videos of highlights of the previous night's baseball game between Team-A and Team-B. The query results 215 should include videos of the previous night's game, rather than videos of games between Team-A and Team-B from last year. Users may be more interested in the videos that have the fresh content.

In another example, there may be a query 213 that is based on the quality of content of a media item 221. For example, a user may submit a query 213 for a music video of Song-X by Artist-Y. The query results 215 may include the official music video released for Song-X by Artist-Y, but may also include other less relevant videos, such as videos of amateur singers performing Song-X, videos of parodies of Song-X, videos presenting the lyrics of Song-X, etc. Users may be more interested in the official music video released for Song-X by Artist-Y and may disregard the other videos in the query results 215.

In another example, a channel may be considered to be a globa channel if the channel has subscribers from multiple geographies (e.g., multiple continents, multiple countries, etc.) and/or if the channel videos are being consumed by user devices in multiple geographies. The channel evaluation module 135 can determine a channel score that takes into account whether the channel is global or not. The channel evaluation module 135 can assign the channel score to the videos of the channels. When the videos are ranked and/or recommended to users, a system (e.g. search system, recommendation system) may apply less or no language demotion to the channel and the channel videos based on the channel score regardless of the user locales.

The channel evaluation module 235 can identify a subset of feature metrics (e.g., channel feature metrics, video feature metrics) that correspond to the query type and can use the subset of feature metrics to determine the channel score for the channel for the particular query type. The channel evaluation module 235 can access configuration data 237 that specifies which subsets of feature metrics correspond to which types of queries. A subset can include a combination of channel metrics and video metrics. For example, the channel evaluation module 235 may determine from the configuration data 237 that the subset of feature metrics that corresponds to a freshness query type may include the average number of videos that are published per hour for the channel, the average amount of time that has elapsed between the time the videos were published and the time the videos of the channel were consumed, the average number of views of the videos of the channel, the number of subscribers of the channel, etc. The configuration data 237 can be stored in the data store 206. The configuration data 237 can be user (e.g., system administrator) defined.

The channel evaluation module 235 can calculate the channel metrics and video metrics for the subset and can store the channel metrics 239 and the video metrics 241 in the data store 206. The channel evaluation module 235 can use the channel metrics 239 and the video metrics 241 to calculate the channel score for the particular query type (e.g., freshness query type) and can store the channel score in the data store 206. One implementation of determining a channel score for the channel for a particular query type is described in greater detail below in conjunction with FIG. 5. The data store 206 can store channel metrics 239 and video metrics 241 for multiple channels and multiple videos. The channel evaluation module 235 can calculate multiple channel scores for multiple channels and can store the channel scores for the channels in the data store 206.

The channel evaluation module 235 can assign the channel scores (e.g., freshness channel score, quality channel score, etc.) of a channel to the media items 221 (e.g., videos) of the channel. One or more of the platforms (e.g., search platform 240, recommendation platform 250) can generate improved results 215 (e.g., query results, recommendation results) based on the channel scores that are assigned to the media items. For example, Channel-A 225 may have a freshness channel score that is higher than Channel-B 227, and the media items 221 (e.g., videos) of Channel-A 225 may be positioned in query results 215 more favorably than the videos of Channel-B 227 by taking into account the freshness channel scores of the channels. The positions in the query results 215 of the media items (e.g., videos) of the channels can have a direction (e.g., promotion, demotion) and magnitude.

The channel evaluation module 235 may communicate with one or more of the content sharing platform 220 and the platforms (e.g., search platform 240, recommendation platform 250), and may collect account information, personal information, and/or demographic information pertaining to groups of users (e.g., age of user groups, geography (e.g., country, state, city) of user groups) and may store the information in one or more data stores (e.g., hard disks, memories, databases, etc.). In situations in which the implementations discussed herein collect personal information and/or demographic about users, or may make use of personal information and/or demographic information, the user may be provided with an opportunity to control whether the channel evaluation module 235 is allowed collect the information (e.g., information about a user's social network, social actions or activities, profession, a user's preferences, or a user's current location), or to control whether and/or how to receive content from the content sharing platform that may be more relevant to the user. In addition, certain data may be treated in one or more ways before it is stored or used, so that personally identifiable information is removed. Thus, the user may have control over how, when, and what type of information is collected about the user and used by the channel evaluation module 235.

Figure 3:
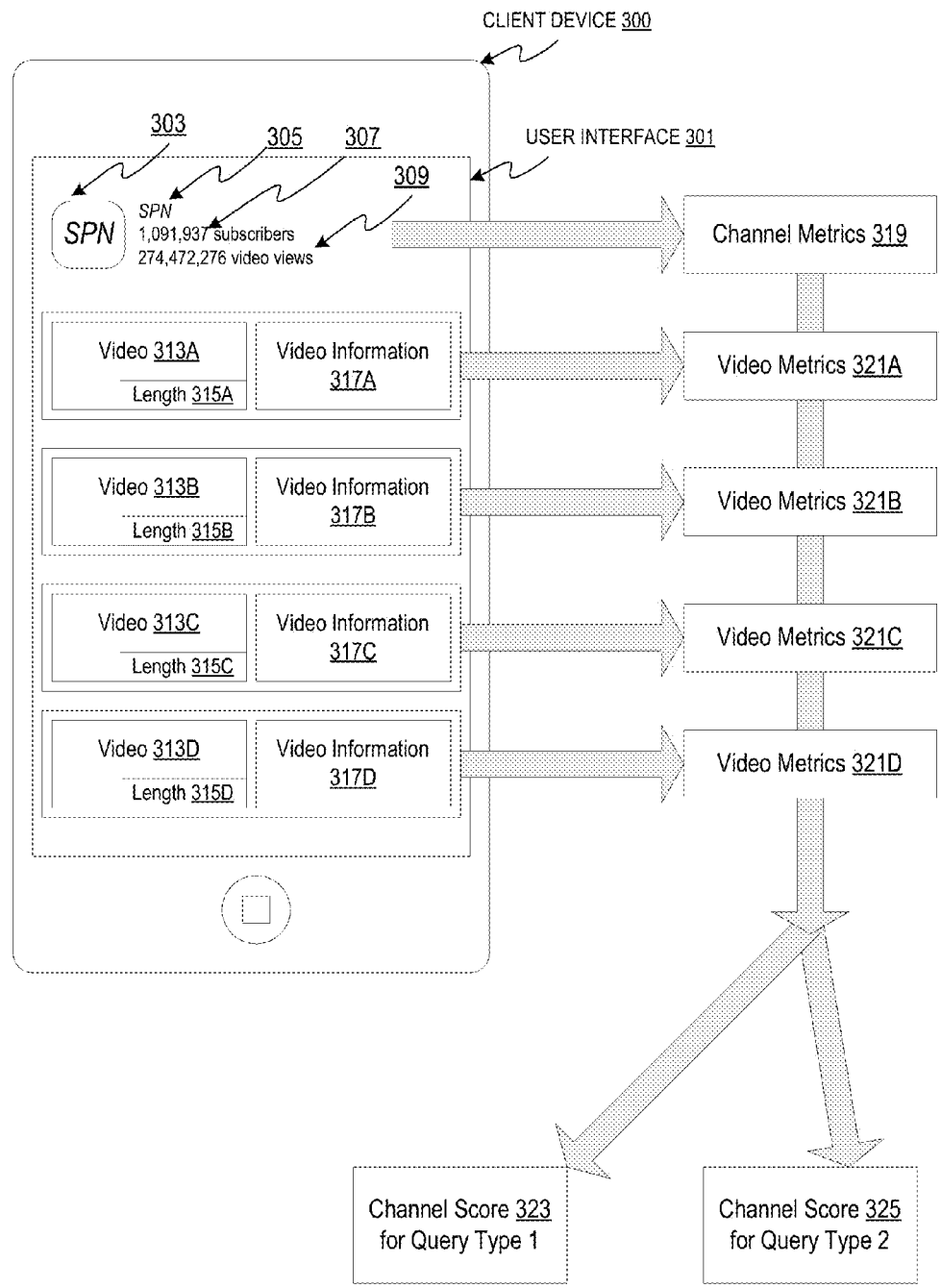
FIG. 3 is a diagram illustrating example feature metrics for an example channel in accordance with one or more implementations.

FIG. 3 is a diagram illustrating example feature metrics for an example channel in accordance with one or more implementations. A client device 300 can include a user interface 301 to provide channel content. For example, the user interface 301 may provide channel content for the Sports Programming Network (SPN) channel. The SPN channel content may include, for example, one or more videos 313A-D, video information 317A-D that corresponds to the videos 313A-D, one or more channel identifiers 303,305, the number of subscribers 307 of the channel, the number of video views 309 of the videos 313A-D in the channel, etc.

The feature metrics of the channel can include metrics for the channel itself, as well as metrics of the media items of the channel. Examples of channel metrics can include, and are not limited to, the number of media items (e.g., videos 313A-D) of the channel, the number of subscribers 307 of the channel, the number of video views 309 of the videos 313A-D of the channel, the number of likes of the channel, a number of recommendations made for the channel, the number of categories associated with the channel, the type of categories associated with the channel, a metric related to the publishing videos for the channel (e.g., the average number of videos that are published per hour for the channel), a channel page rank, and/or an indication of the channel being consumed globally, etc.

Examples of metrics of a media item (e.g., videos 313A-D) can include, and are not limited to, a number of recommendations made of a video, a number of likes of the video, a number of views of the video, a ranking of the video, a metric relating to the release of the video, a number of shares of the video, a number of links to the video, a metric related to consumption time of the video, a format of the video, length (e.g., length 315A-D) of the video, a consumption locale, etc. For example, video information 317A for Video 313A may include "HD" (high definition) format, a length of "06:44" minutes, a title of "Basketball Game 1 of Conference Semi-Finals", "121 views", the time elapsed since being uploaded as "55 minutes ago," etc. In one implementation, the video metrics can include a statistical analysis of an aggregate of the data for the videos of the channel. For example, the video metrics can include, and are not limited to, the average consumption time for the videos of the channel, the average number of likes for the videos of the channel, the average number of times videos of the channel are being recommended, the average amount of time that has elapsed between videos being published to the channel and videos of the channel being consumed, the average number of shares of the videos, the average number of links to the videos, etc.

The channel metrics 319 of the channel and the media item metrics (e.g., video metrics 321A-D) of the videos of the channel can be used to generate channel scores 323,325 for the channel for the various query types. For example, the channel may have a channel score 323 for a freshness query type and a channel score 325 for a quality query type, etc. One implementation of determining a channel score is described in greater detail below in conjunction with FIG. 5. The channel scores may be any number, text, and/or value. For example, the freshness channel score 323 may be a numerical value from 0 to 1 (e.g., 0.8), where a value of 0 indicates that the channel is associated with stale content and a value of 1 indicates that the channel is associated with a very high level of fresh content. In another example, the quality channel score 325 may be a numerical value from 1 to 10, or 1 to 100, where a higher number indicates that the channel is associated with a higher level of relevant content. The format of the channel scores and the definitions of the channel scores can be stored in configuration data (e.g., configuration data 237 in FIG. 2).

The various channel scores 323,325 for the channel can be assigned to the media items (e.g., videos 313A-D) of the channel. The various channel scores 323,325 can be provided to one or more systems. A system (e.g., search system, recommendation system) can use the channel scores 323,325 that are assigned to the videos of the channel to rank the videos of the channel in system results (e.g., search results, recommendation results).

Figure 4:
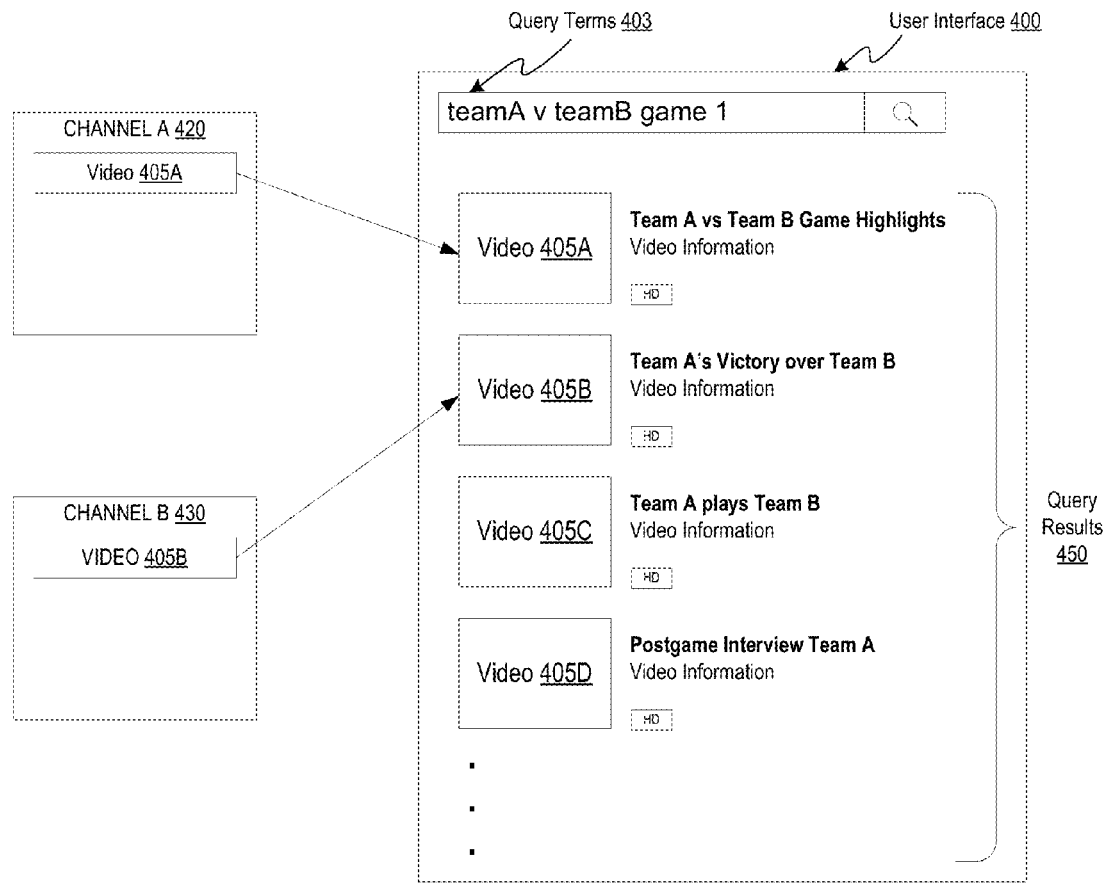
FIG. 4 is an example user interface for a query result in accordance with one or more implementations.

FIG. 4 is an example user interface 400 for a query result in accordance with one or more implementations. For example, a user can be presented with the user interface 400 in response to a user searching for a topic of interest on a content sharing platform. For example, the query may be for videos relating to Basketball Game 1 of Team A playing against Team B in a Conference Semi-Finals Game Series. The user interface 400 can be provided to a user, for example, via a web browser, in an application (e.g., desktop application, mobile application, gaming application, television application), embedded in a third party document (e.g., web page), etc.

The user interface 400 can include query results 450. The query results 450 can be presented in response to a search query being submitted on a topic. The query results 450 can include a list of one or more videos 405A-D, which may be from one or more channels (e.g., Channel A 420, Channel B 430), that are related or associated with the topic submitted in the search query. For example, if a user submitted query terms 403 "teamA v teamB game 1", the query results 450 presented will be related to Basketball Game 1 of Team A playing against Team B.

The query results 450 can include the names of the videos 405A-D, such as "Team A vs Team B Game Highlights", "Team A's Victory over Team B", "Team A plays Team B", "Postgame Interview Team A," etc. The query results 450 can include links to the videos 405A-D, such that a user can select a link to consume the corresponding video.

The position of the videos 405A-D in the query results 450 can be, at least in part, based on the channel score that is assigned to the corresponding video. For example, the query for "teamA v teamB game 1" may be a freshness query type. Channel A 420 may have a freshness channel score that is higher than Channel B 430. The freshness channel score of Channel A 420 may be assigned to Video 405A, and the freshness channel score of Channel B 430 may be assigned to Video 405B. Video 405A of Channel A 420 may be positioned in the query results 450 in a more favorable (e.g., higher) position than Video 405B of Channel B 430 by taking into account the freshness channel scores of the channels.

Figure 5:
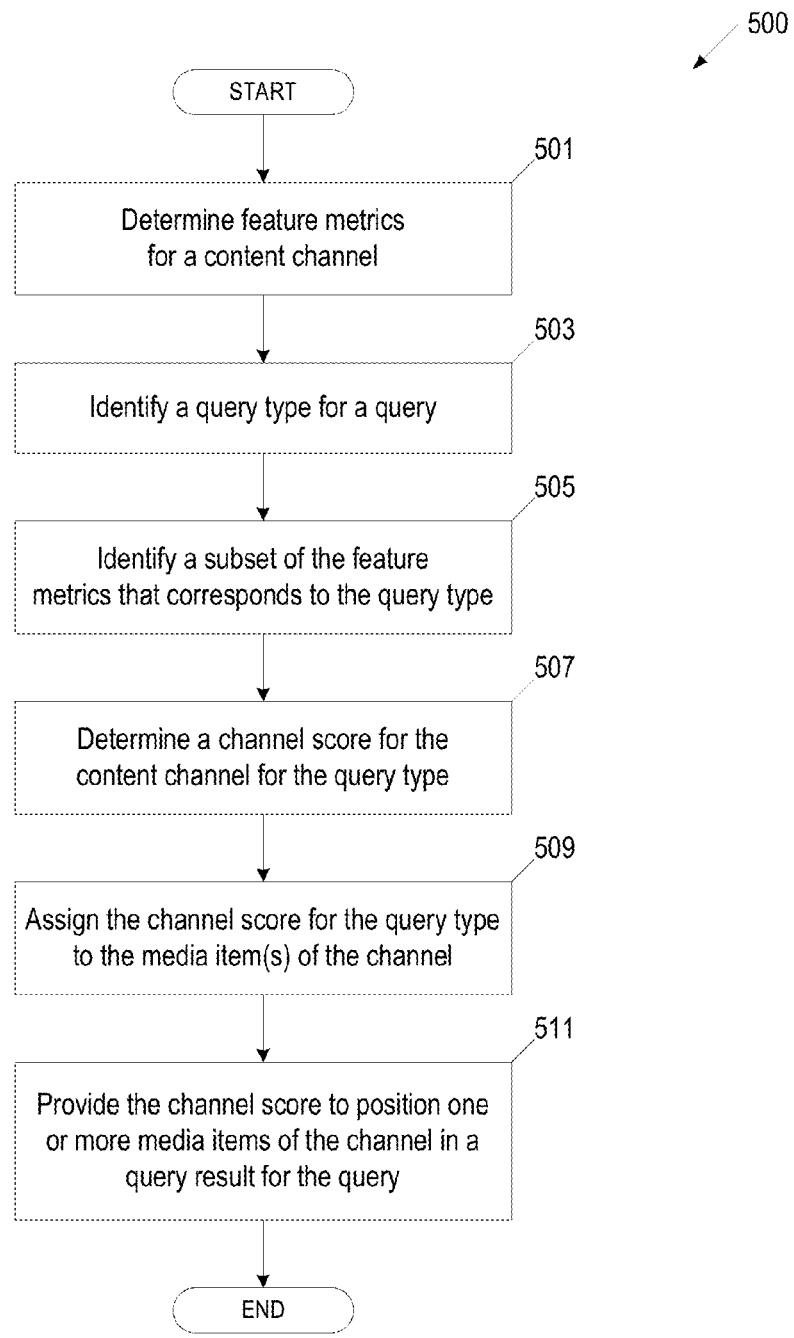
FIG. 5 is flow diagram of an implementation of a method for evaluating a channel, according to various implementations.

FIG. 5 is flow diagram of an implementation of a method 500 for evaluating a channel. The method may be performed by processing logic that may comprise hardware (circuitry, dedicated logic, etc.), software (such as is run on a general purpose computer system or a dedicated machine), or a combination of both. In one implementation, the method 500 may be performed by the channel evaluation module 235 hosted in a server 230 in FIG. 2.

At block 501, the server determines feature metrics for a content channel. The server can access data in one or more data stores to determine the feature metrics for the content channel. The feature metrics can include channel metrics for the channel itself and video metrics for the videos of the channel. In one implementation, the server uses one or more time windows to determine the channel metrics and/or video metrics. Examples of time windows can include, and are not limited to, one day, three days, seven days, etc. The time windows can be configurable and user (e.g., system administrator) defined. The server can access configuration data to determine which time window should be used for the channel metrics and/or video metrics. For example, the server may aggregate data for videos for the past seven days and may determine the video metrics using the data from the 7-day time window.

At block 503, the server identifies a query type for a query. The server can detect a query and can determine the query type for the query. For example, the server may receive a message from a search system indicating that there is a query and may determine that the query is a freshness type of query. The message can include a query type identifier.

At block 505, the server identifies a subset of the feature metrics that corresponds to the query type. The server can access configuration data that specifies which subsets of feature metrics correspond to which types of queries. For example, the server may determine from the configuration data that the subset of feature metrics that corresponds to a freshness query type may include the average number of videos that are published per hour for the channel, the average amount of time that has elapsed between the time the videos were published and the time the videos of the channel were consumed, the average number of views of the videos of the channel, the number of subscribers of the channel, etc.

At block 507, the server determines a channel score for the content channel for the query type. For example, the server determines a freshness channel score for the channel for a freshness query type. In one implementation, the server determines a sum of the channel metrics and the video metrics of the subset as the channel score for the query type. In one implementation, the server weighs the values of the subset of feature metrics and determines the sum of the weighted values to create the channel score for the query type. The server can access configuration data that specifies the weights that should be applied to the channel metrics and video metrics in the subset.

At block 509, the server assigns the channel score to the media items (e.g., videos) of the channel. For example, the channel may have thousands of videos, and the server may assign the freshness channel score to the thousands of videos of the channel. At least a portion of method 500 can be iterative. In one example, the number of iterations may be based on the number of query types. For example, the server can determine channel scores for a channel for a freshness query type, a quality query type, a language demotion query type, etc., and may assign the various channel scores of the channel for the query types to the videos of the channel. In another example, the number of iterations may be based on the number of channels. For example, the server can determine channel scores for multiple channels.

At block 511, the server provides the channel score for the query type to a system to position one or more of the media items of the channel in a query result for the query. For example, the server may provide the channel score for the videos of the channel to a search system, and the search system can use the channel scores for the videos to rank the videos of the channel in a query result.

Figure 6:
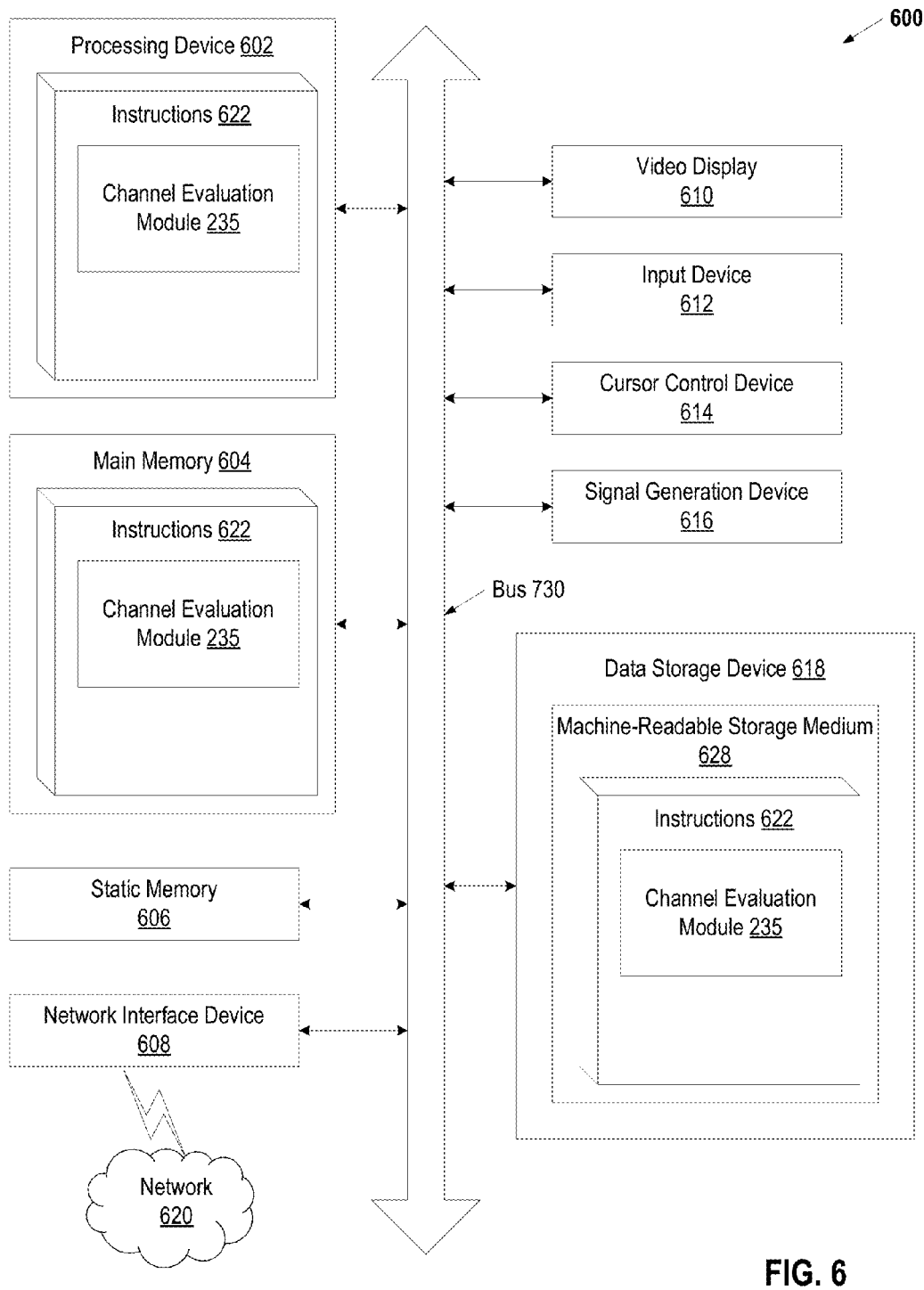
FIG. 6 is a block diagram of an example computer system that may perform one or more of the operations described herein, in accordance with various implementations.

FIG. 6 illustrates a diagram of a machine in an example form of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processing device (processor) 602, a main memory 604 (e.g., read-only memory (ROM), flash memory, dynamic random access memory (DRAM) such as synchronous DRAM (SDRAM), double data rate (DDR SDRAM), or DRAM (RDRAM), etc.), a static memory 606 (e.g., flash memory, static random access memory (SRAM), etc.), and a data storage device 614, which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 622 for performing the operations and steps discussed herein.

The computer system 600 may further include a network interface device 604. The computer system 600 also may include a video display unit 610 (e.g., a liquid crystal display (LCD) or a cathode ray tube (CRT)), an input device 612 (e.g., a keyboard, and alphanumeric keyboard, a motion sensing input device,), a cursor control device 614 (e.g., a mouse), and a signal generation device 616 (e.g., a speaker).

The data storage device 614 may include a computer-readable storage medium 624 on which is stored one or more sets of instructions 622 (e.g., software) embodying any one or more of the methodologies or functions described herein. The instructions 622 may also reside, completely or at least partially, within the main memory 604 and/or within the processor 602 during execution thereof by the computer system 600, the main memory 604 and the processor 602 also constituting computer-readable storage media. The instructions 622 may further be transmitted or received over a network 620 via the network interface device 608.

In one implementation, the instructions 622 include instructions for a channel evaluation module (e.g., channel evaluation module 235 in FIG. 2) and/or a software library containing methods that call the channel evaluation module.

While the computer-readable storage medium 628 (machine-readable storage medium) is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "receiving", "evaluating", "providing", "assigning", "or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving a query corresponding to one of a plurality of query types, the one of the plurality of query types being associated with a subset of a plurality of feature metrics of a plurality of content channels, each of the content channels comprising a plurality of media items;
   evaluating, by a computer system, a content channel of the plurality of content channels based on the subset of feature metrics of the content channel to produce a channel score of the content channel for the query type;
   assigning the channel score of the content channel to the plurality of media items of the content channel; and
   providing the channel score to position at least one of the plurality of media items of the content channel in a query result of the query.

2. The method of claim 1, wherein the one of the plurality of query types comprises a query based on freshness of data, a query based on quality of data, a query related to channels, or a query related to language demotion.

3. The method of claim 1, wherein the plurality of feature metrics comprises a plurality of channel metrics and a plurality of media item metrics for the plurality of media items.

4. The method of claim 3, wherein the plurality of channel metrics comprises at least two of a subscriber count, a number of media items associated with the channel, a number of likes of the channel, a number of recommendations of the channel, a number of online media item views of the channel, a number of categories associated with the channel, or a type of category associated with the channel.

5. The method of claim 3, wherein plurality of media item metrics comprises at least two of a consumption time metric, a number of likes, a number of recommendations, a number of views, a ranking, or a metric related to release of the media item.

6. The method of claim 1, further comprising:
   determining a plurality of channel scores for the channel, the plurality of channel scores corresponding to the plurality of query types.

7. The method of claim 6, further comprising:
   assigning the plurality of channel scores for the channel to the plurality of media items of the channel.

8. A system comprising:
   a memory; and
   a processing device coupled with the memory to:
      receive a query corresponding to one of a plurality of query types, the one of the plurality of query types being associated with a subset of a plurality of feature metrics of a plurality of content channels, each of the content channels comprising a plurality of media items;
      evaluate a content channel of the plurality of content channels based on the subset of feature metrics of the content channel to produce a channel score of the content channel for the query type;
      assign the channel score of the content channel to the plurality of media items of the content channel; and
      provide the channel score to position at least one of the plurality of media items of the content channel in a query result of the query.

9. The system of claim 8, wherein the one of the plurality of query types comprises a query based on freshness of data, a query based on quality of data, a query related to channels, or a query related to language demotion.

10. The system of claim 8, wherein the plurality of feature metrics comprises a plurality of channel metrics and a plurality of media item metrics for the plurality of media items.

11. The system of claim 10, wherein the plurality of channel metrics comprises at least two of a subscriber count, a number of media items associated with the channel, a number of likes of the channel, a number of recommendations of the channel, a number of online media item views of the channel, a number of categories associated with the channel, or a type of category associated with the channel.

12. The system of claim 10, wherein plurality of media item metrics comprises at least two of a consumption time metric, a number of likes, a number of recommendations, a number of views, a ranking, or a metric related to release of the media item.

13. The system of claim 8, wherein the processing device is further to:
   determine a plurality of channel scores for the channel, the plurality of channel scores corresponding to the plurality of query types; and
   assign the plurality of channel scores for the channel to the one or more media items of the channel.

14. A non-transitory computer readable storage medium encoding instructions thereon that, in response to execution by a processing device, cause the processing device to perform operations comprising:
   receiving a query corresponding to one of a plurality of query types, the one of the plurality of query types being associated with a subset of a plurality of feature metrics of a plurality of content channels, each of the content channels comprising a plurality of media items;
   evaluating, by the processing device, a content channel of the plurality of content channels based on the subset of feature metrics of the content channel to produce a channel score of the content channel for the query type;

assigning the channel score of the content channel to the plurality of media items of the content channel; and providing the channel score to position at least one of the plurality of media items of the content channel in a query result of the query.

15. The non-transitory computer readable storage medium of claim 14, wherein the one of the plurality of query types comprises a query based on freshness of data, a query based on quality of data, a query related to channels, or a query related to language demotion.

16. The non-transitory computer readable storage medium of claim 14, wherein the plurality of feature metrics comprises a plurality of channel metrics and a plurality of media item metrics for the plurality of media items.

17. The non-transitory computer readable storage medium of claim 16, wherein plurality of media item metrics comprises at least two of a consumption time metric, a number of likes, a number of recommendations, a number of views, a ranking, or a metric related to release of the media item.

18. The non-transitory computer readable storage medium of claim 14, wherein the plurality of channel metrics comprises at least two of a subscriber count, a number of media items associated with the channel, a number of likes of the channel, a number of recommendations of the channel, a number of online media item views of the channel, a number of categories associated with the channel, or a type of category associated with the channel.

19. The non-transitory computer readable storage medium of claim 14, the operations further comprising:

determining a plurality of channel scores for the channel, the plurality of channel scores corresponding to the plurality of query types.

20. The non-transitory computer readable storage medium of claim 19, the operations further comprising:

assigning the plurality of channel scores for the channel to the plurality of media items of the channel.

* * * * *